United States Patent [19]

Kumagai et al.

[11] Patent Number: 5,471,301
[45] Date of Patent: Nov. 28, 1995

[54] OPTICAL FIBER GYRO

[75] Inventors: Tatsuya Kumagai; Hisao Iitsuka, both of Hitachi; Hiroshi Kajioka, Moriya; Wataru Ohnuki, Hitachi; Toshiyuki Tetsu, Kitaibaraki, all of Japan

[73] Assignee: Hitachi Cable, Ltd., Tokyo, Japan

[21] Appl. No.: 223,711

[22] Filed: Apr. 5, 1994

[30] Foreign Application Priority Data

Aug. 23, 1993 [JP] Japan .................................. 5-227802
Aug. 23, 1993 [JP] Japan .................................. 5-227803
Dec. 20, 1993 [JP] Japan .................................. 5-344503

[51] Int. Cl.$^6$ .................................................. G01C 19/64
[52] U.S. Cl. .................................................. 356/350
[58] Field of Search .................................................. 356/350

[56] References Cited

U.S. PATENT DOCUMENTS 4,529,313 7/1985 Petermann et al. .................... 356/350
4,842,409 6/1989 Arditty et al. ........................ 356/350
4,848,910 7/1989 Dupraz .................................. 356/350

*Primary Examiner*—Vincent P. McGraw
*Attorney, Agent, or Firm*—Helfgott & Karas

[57] ABSTRACT

In an optical fiber gyro for detecting a rotation angular velocity by Sagnac phase difference of light signals propagated through an optical fiber sensing loop, no polarizer is used, and a light source having a difference in attenuation or amplification factor between two orthogonally polarized lights is used. Alternatively, a light source is optically coupled to an optical coupler for supplying two divided light signals to the sensing loop and receiving the two light signals propagated through sensing loop by an optical fiber of a predetermined length which is set to meet a relation in which a distance difference determined by the predetermined length and a phase difference of two orthogonally polarized lights propagated through the optical fiber is greater than an interference distance of the light source.

5 Claims, 6 Drawing Sheets

OPTICAL FIBER GYRO

FIELD OF THE INVENTION

The invention relates to an optical fiber gyro, and more particularly to, the decrease of optical parts to be used in an optical fiber gyro.

BACKGROUND OF THE INVENTION

One type of a conventional optical fiber gyro comprises a light source of a laser diode for emitting a light signal, a first optical coupler having bar and cross states for light signals to select one or two of output terminals, a polarizer for polarizing light signals and decreasing interference noise of light signals, a second optical coupler having the same function as the first optical coupler, an optical fiber sensing loop for propagating light signals in clockwise and counter clockwise directions, a phase modulator for modulating phases of light signals propagated through the sensing loop, a light receiver of a photodiode for receiving a light signal supplied from the first optical coupler, and a signal processing circuit for processing an electric signal supplied from the light receiver to calculate a rotation angular velocity in accordance with the below equation, $$\Omega = \psi s/a$$

where "$\Omega$" is the rotation angular velocity "$\psi s$" is a Sagnac phase difference, that is, a phase difference of light signals propagated through the sensing loop in the clockwise and counter clockwise directions, and "a" is defined by the below equation, $$a = 4\pi R l / \lambda c$$

where "R" is the radius of the sensing loop, "l" is the length of the sensing loop, "$\lambda$" is the wavelength of the light signal and "C" is the velocity of light.

In operation, a light signal is emitted from the light source to be supplied to the first optical coupler, and the light signal is then supplied via the polarizer to the second optical coupler. Thus, the light signal is divided to be propagated through the sensing loop in the clockwise and counter clockwise directions, and then returned to the second optical coupler. The returned light signal is supplied in the opposite direction to the polarizer, and then to the first optical coupler, from which the light signal is supplied to the light receiver. In the light receiver, the light signal is converted to an electric signal which is then processed in the signal processing circuit. Thus, a rotation angular velocity of a rotating member on which the sensing loop is mounted is calculated in the signal processing circuit. In this conventional optical fiber gyro, even if a light source emitting a less linearly polarized light signal is used, a predetermined precision is obtained in detecting the rotation angular velocity, because a polarizer is used.

In the conventional optical fiber gyro, however, there is a disadvantage in that the number of optical parts is large to increase the cost of fabricating the same, and the assembly of the same is difficult due to the number of the optical parts.

For this reason, another type of a conventional optical fiber gyro has been proposed in which a photodiode is integrated with a laser diode, so that the aforementioned first optical coupler is omitted to decrease the number of the optical parts.

However, the aforementioned disadvantage is never overcome in the latter conventional optical fiber gyro, because the decrease of optical parts is not sufficient in number.

Accordingly, it is an object of the invention to provide an optical fiber gyro in which the number of optical parts is decreased to lower the cost of fabricating the same, and to facilitate the assembly of the same.

It is a further object of the invention to provide an optical fiber gyro in which the reliability is increased in accordance with the decrease in number of optical parts.

It is a still further object of the invention to provide an optical fiber gyro in which a low-priced laser diode is used, because means for decreasing interference noise is adopted.

According to the first feature of the invention, an optical fiber gyro, comprises:

a light source for emitting a light signal;

an optical coupler for receiving the light signal to be divided into first and second light signal, and receiving third and fourth light signals to be combined as a combined light signal;

an optical fiber sensing loop having first and second ends, the first and second light signals being optically coupled to the first and second ends of the optical fiber sensing loop to be propagated through the optical fiber sensing loop in clockwise and counter clockwise directions and to be supplied as the third and fourth light signals from the first and second ends;

a light receiver for receiving the combined light signal to be converted into an electric signal, the combined light signal being transmitted through the light source and the light receiver being positioned behind the light source; and a signal processing circuit for processing the electric signal to provide a rotation angular velocity of a rotating member in accordance with a phase difference of the third and fourth light signals, the rotating member being loaded with the optical fiber sensing loop;

wherein the light source has a difference in attenuation or amplification factor between two light signals of orthogonal polarizations; and the optical fiber sensing loop is of a polarization plane maintaining optical fiber.

According to the second feature of the invention, an optical fiber gyro, comprises:

a light source for emitting a light signal;

an optical fiber for propagating the light signal to a predetermined position, the optical fiber having a predetermined length;

an optical coupler for receiving the light signal supplied from the optical fiber to be divided into first and second light signals, and receiving third and fourth light signals to be combined as a combined light signal;

an optical fiber sensing loop having first and second ends, the first and second light signals being optically coupled to the first and second ends of the optical fiber sensing loop to be propagated through the optical fiber sensing loop in clockwise and counter clockwise directions and to be supplied as the third and fourth light signals from the first and second ends a light receiver for receiving the combined light signal supplied from the optical fiber to be converted into an electric signal, the combined light signal being transmitted through the light source, and the light receiver being positioned behind the light source; and a signal processing circuit for processing the electric signal to provide a rotation angular velocity of a rotating member in accordance with a phase difference of the third and forth light signals, the rotating member being loaded with the optical fiber sensing loop;

wherein the predetermined length of the optical fiber is set to meet a relation in which a distance difference determined by the predetermined length and a phase difference of two orthogonally polarized lights propagated through the optical fiber is greater than an interference distance of the light source; and the optical fiber and the optical fiber sensing loop are of a polarization plane maintaining optical fiber.

BRIEF DESCRIPTION OF THE DRAWINGS

The invention will be described in more detail in conjunction with the appended drawings, wherein.

DETAILED DESCRIPTION OF THE PREFERRED EMBODIMENTS

Before describing an optical fiber gyro in the preferred embodiments according to the invention, the aforementioned conventional optical fiber gyros will be explained.

Figure 1:
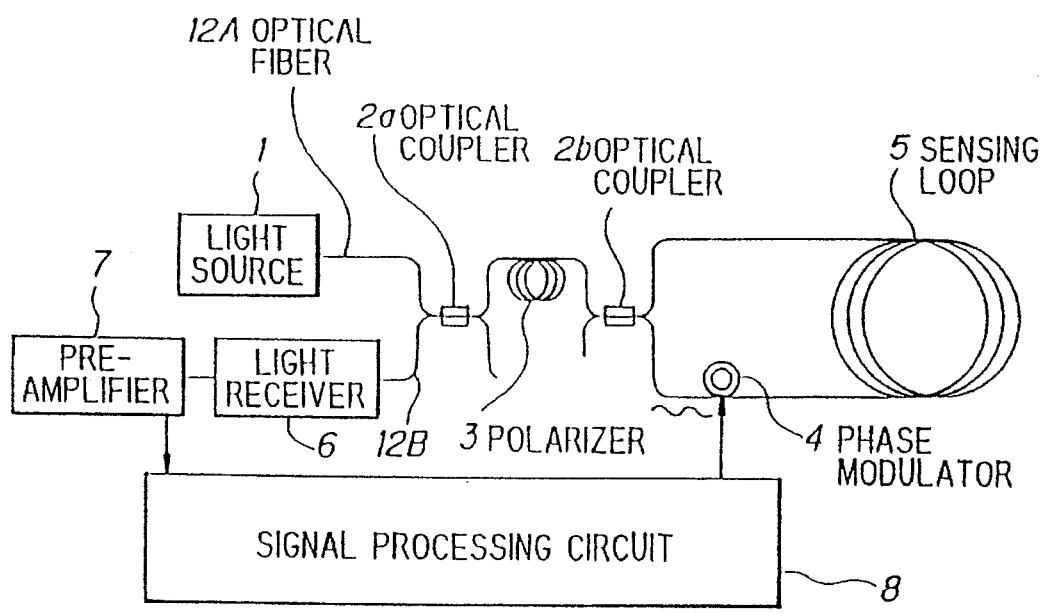
FIG. 1 is an explanatory diagram showing a first conventional optical fiber gyro.

FIG. 1 shows the first conventional optical fiber gyro which comprises a light source 1 of a laser diode, first and second optical couplers 2a and 2b, a polarizer 3, a phase modulator 4, an optical fiber sensing loop 5, a light receiver 6 of a photodiode, a preamplifier 7, and a signal processing circuit 8.

In the first conventional optical fiber gyro, the first optical coupler 2a is provided between an optical fiber 12A coupled to the light source 1 and the polarizer 3, and between an optical fiber 12B coupled to the light receiver 6 and the polarizer 3, so that a light signal emitted from the light source 1 is supplied via the first optical coupler 2a to the polarizer 3, and a light signal is supplied via the first optical coupler 2a from the polarizer 3 to the light receiver 6 subsequently to the propagation through the sensing loop 5.

As apparent from the illustration of the first conventional optical fiber gyro in FIG. 1, the number of optical parts is large. This is the aforementioned disadvantage which is not explained here again, and operation is not also explained here again.

Figure 2:
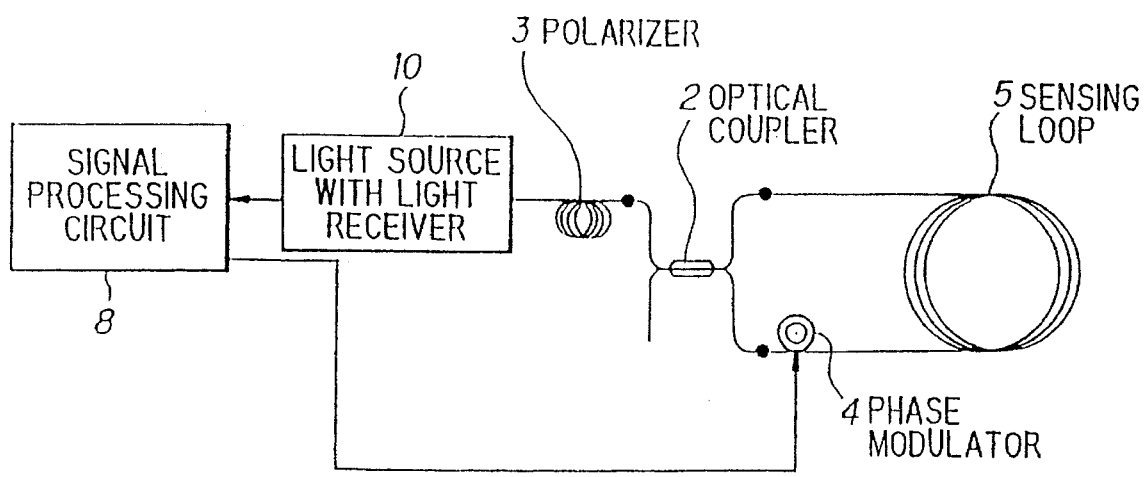
FIG. 2 is an explanatory diagram showing a second conventional optical fiber gyro.

FIG. 2 shows the second conventional optical fiber gyro which comprises a light source 10 with a light receiver in which a laser diode and a photodiode are integrated on a common semiconductor substrate, an optical coupler 2, a polarizer 3, a phase modulator 4, an optical fiber sensing loop 5, a signal processing circuit 8, and a preamplifier (not shown) provided at the front stage of the signal processing circuit 8.

As apparent from the illustration of the second conventional optical fiber gyro in FIG. 2, an optical coupler corresponding to the first optical coupler as shown in FIG. 1 is omitted, because the laser diode and the photodiode are positioned on a common light path in accordance with the integrated fabrication structure thereof.

Even in the second conventional optical fiber gyro, the aforementioned disadvantage is not overcome.

Figure 3:
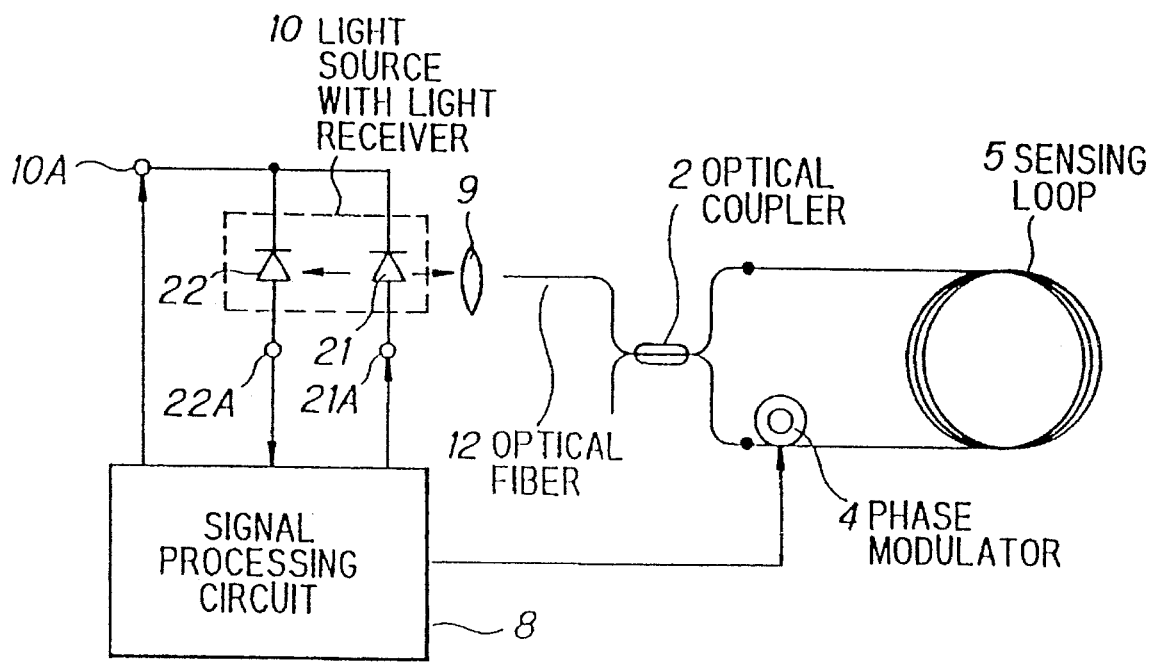
FIG. 3 is an explanatory diagram showing an optical fiber gyro in a first preferred embodiment according to the invention.

Next, an optical fiber gyro in the first preferred embodiment according to the invention will be explained in FIG. 3.

The optical fiber gyro comprises a light source 10 integrated with a light receiver, a light coupling lens 9, an optical coupler 2, a phase modulator 4, an optical fiber sensing loop 5, and a signal processing circuit 8, wherein the light source 10 integrated with the light receiver is, for instance, a GaAlAs laser diode 21 fabricated with a PIN photodiode 22 on a common semiconductor substrate, and the optical fiber 12 and the sensing loop 5 are of a polarized plane maintaining optical fiber. In this preferred embodiment, the GaAlAs laser diode 22 is different in attenuation factor or amplification factor between two lights having orthogonal polarizations, and is connected to the signal processing circuit 8 by an anode 21A and a common electrode 10A, and the PIN photodiode 22 is connected to the signal processing circuit 8 by an anode 22A and the common electrode 10A.

In operation, a bias current in the range of 35 to 45 mA is supplied to the GaA1As laser diode 21 to emit a light signal which is coupled to an incident end of the optical fiber 12 by the coupling lens 9. The light signal is propagated through the optical fiber 12 to be supplied to the optical coupler 2, in which the light signal is divided into two light signals to be propagated through the sensing loop 5 in the clockwise direction and the counter clockwise direction and to be modulated in phase by the phase modulator 4. The propagated light signals are returned to the optical coupler 2 to be a combined light signal which will be propagated through the optical fiber 12 in the opposite direction to be coupled to the GaA1As laser diode 21. The received light signal is transmitted through the GaAlAs laser diode 21 to be received by the PIN photodiode 22, in which the light signal is converted to an electric signal. The electric signal is processed in the signal processing circuit 8 to calculate a rotation angular velocity in accordance with the aforementioned equation.

Figure 4:
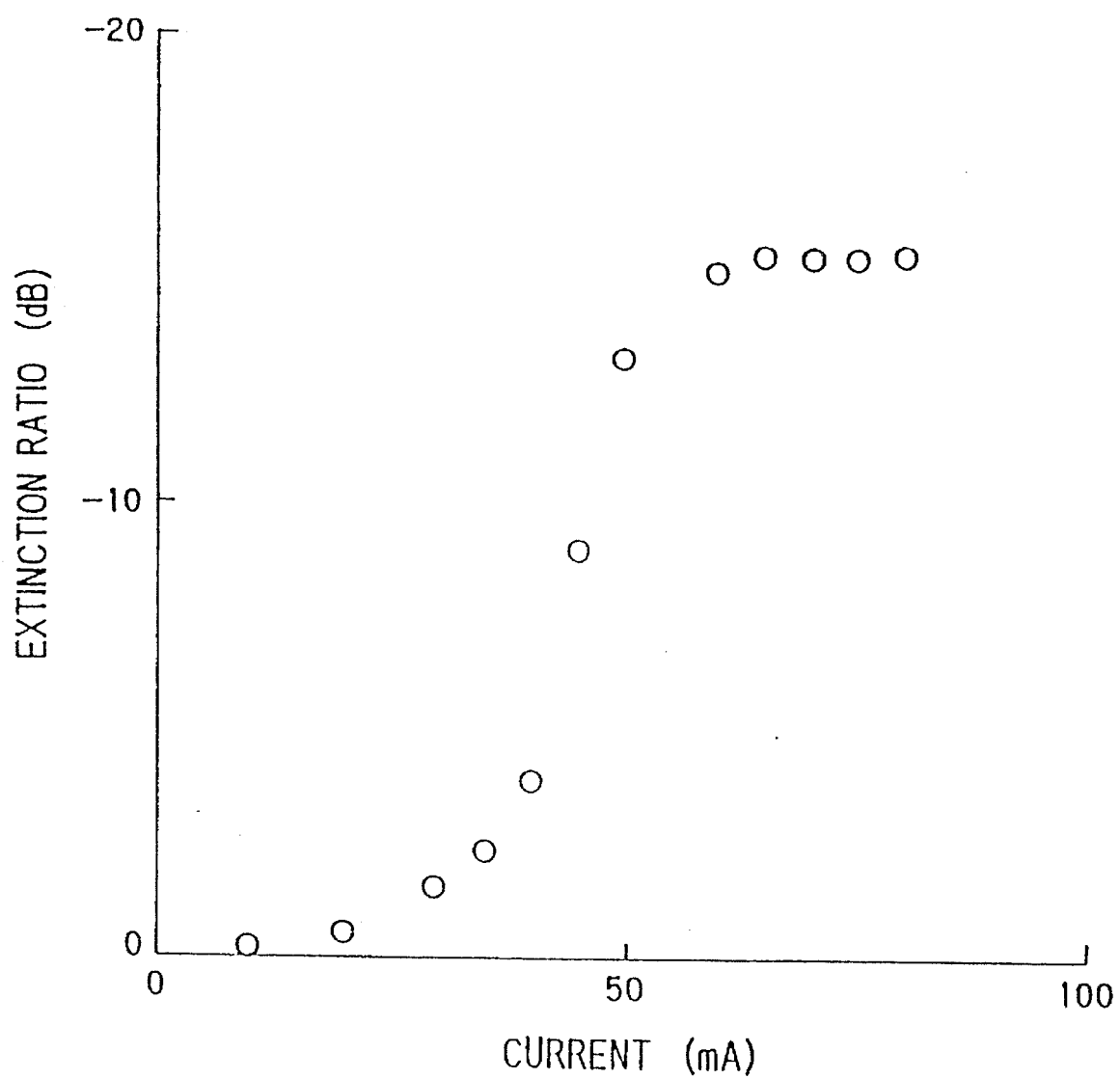
FIG. 4 is a graph showing an extinction ratio relative to a current for a laser diode as a light source in the first preferred embodiment.

FIG. 4 shows the relation between the bias current supplied to the GaA1As laser diode Z1 and the extinction ratio, wherein the extinction ratio $\epsilon$ is decreased, as the supplied current is increased, so that the polarization ratio p is decreased in accordance with the below equation.

$$\epsilon = \log p$$

In this equation, p is defined by py/px(p=py/py), where Px and Py are intensities of two lights having orthogonal polarizations.

As understood from FIG. 4, the current supplied to the GaA1As laser diode 21 is appropriate to be 35 to 45 mA.

Consequently, the range of the extinction ratio $\epsilon$ is $$-10db \leq \epsilon \leq -2dB, \text{ and}$$

the range of the polarization ratio p corresponding to the extinction ratio p is $$0.1 \leq p \leq 0.63$$

If the extinction ratio p is greater than −2dB (the polarization ratio p is greater than 0.63), the polarization drift occurs in which one of two lights having orthogonal polarizations is leaked to the other light to result in the generation of combined lights having a phase difference therebetween, occurs and if the extinction ratio ε is less than −10dB (the polarization ratio p is less than 0.1) interference noise which is caused by the interference of a light emitted from the light source and a light reflected at connection node such as an optical coupler, etc. and which is often generated at the time of driving the light source occurs.

In this range, the most appropriate values are

ε=−5dB, and p=0.32, correspondingly.

In general, the zero-point drift $\Delta\Omega p$ is defined by the below equation, $$\Delta\Omega p \leq 180 \cdot \epsilon \cdot (2\zeta + 4\eta) \cdot p / \pi \cdot a \, [°/s]$$

where "a" is a scale factor of an optical fiber gyro, "ζ" is cross talk of a polarization plane maintaining optical fiber, and "η" is cross talk of an optical coupler, provided that "ε" is the extinction ratio based on the polarization attenuation or amplification effect of a light source in the invention where no polarizer is used.

In the preferred embodiment, the extinction ratio ε is small, that is, the difference in the attenuation or amplification factor between orthogonal polarizations of the GaAlAs laser diode 21 is large, so that the zero-point drift is small.

Figure 5A:
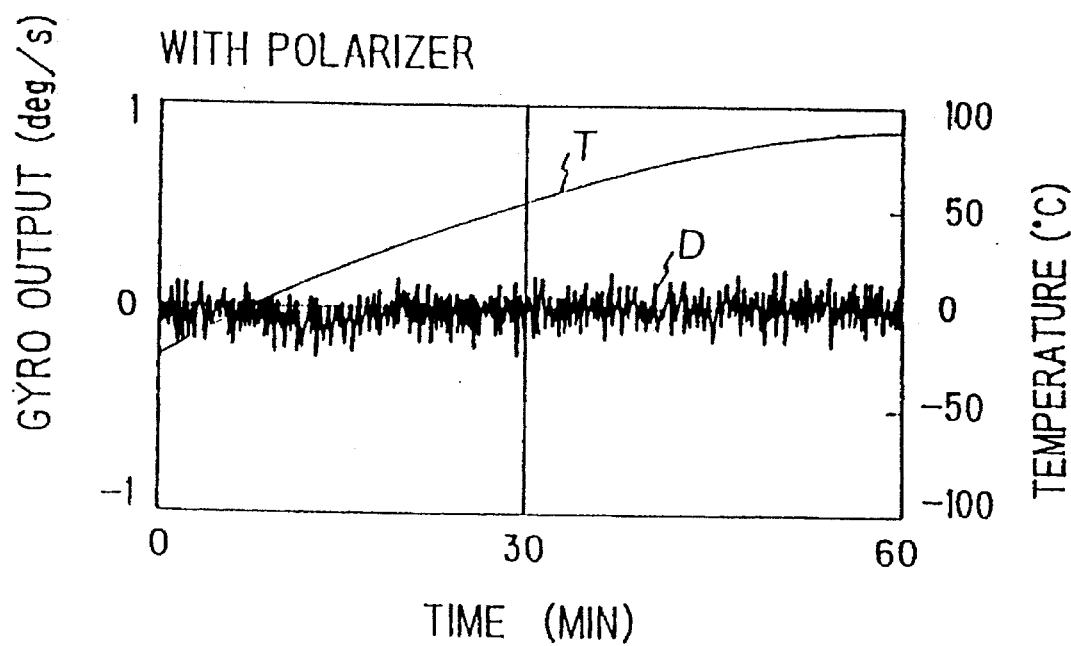
FIGS. 5A and 5B are graphs showing static drift and temperature characteristics in states where no polarizer is provided as in an optical fiber in the first preferred embodiment, and a polarizer is
Figure 5B:
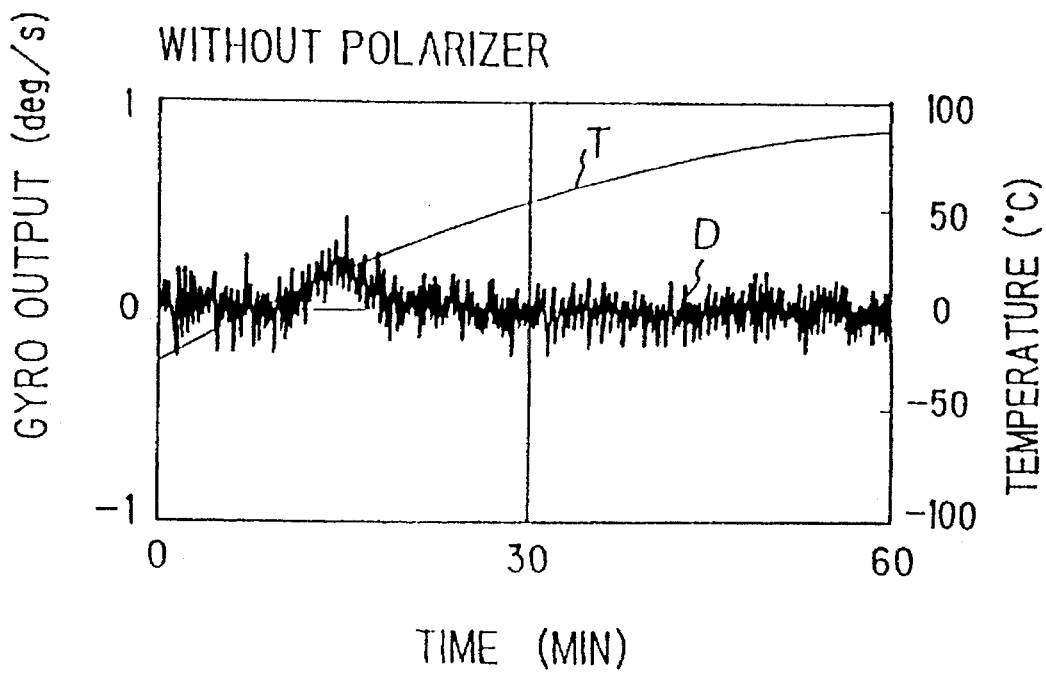

FIGS. 5A and 5B show the comparison of the static drift and temperature characteristics between the case where a polarizer is used as in the conventional optical fiber gyro and the case where no polarizer is used, but the GaAlAs laser diode 21 having a difference in the attenuation or amplification factor between orthogonal polarizations is used, as explained above in the first preferred embodiment wherein T indicates the temperature, and D indicates the drift.

In an experiment in which the results of FIGS. 5A and 5B are obtained, the temperature is changed in the range of −30° to 85° C.

As understood from the above results, no drift occurs expect for a limited range of the temperature change as shown in FIG. 5B. This means that an optical fiber gyro in the first preferred embodiment is sufficiently applied to the practical use.

Figure 6:
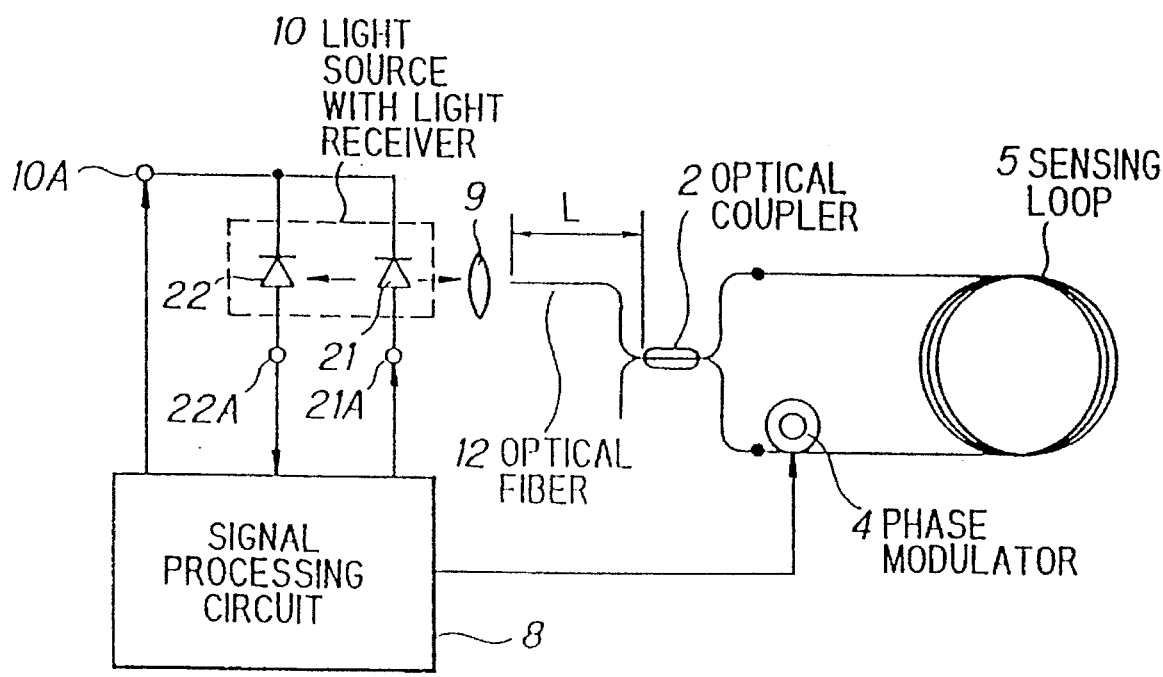
FIG. 6 is an explanatory diagram showing an provided as in the conyenonal optical fiber gyro, optical fiber gyro in a second preferred embodiment according to the invention.

An optical fiber gyro in the second preferred embodiment according to the invention will be explained in FIGS. 6 and 7, wherein like parts are indicated by like reference numerals as used in FIG. 3.

In the optical fiber gyro, no polarizer is used, and the length L of an optical fiber 12 from the end thereof facing a coupling lens 9 to an optical coupler 2 is set to be greater than 2.564 m, under the condition that a GaAlAs laser diode 2 having a PIN photodiode 22 therein is used for a light source 10, an elliptical core polarization plane maintaining optical fiber is used for the optical fiber 12 and a sensing loop 5, wherein a wavelength of the GaAlAs laser diode 21 is 0.78 μm, a coupling length of the polarization plane maintaining optical fiber is approximately 2 mm, and an interference distance of the light source is approximately 1 mm.

Figure 7:
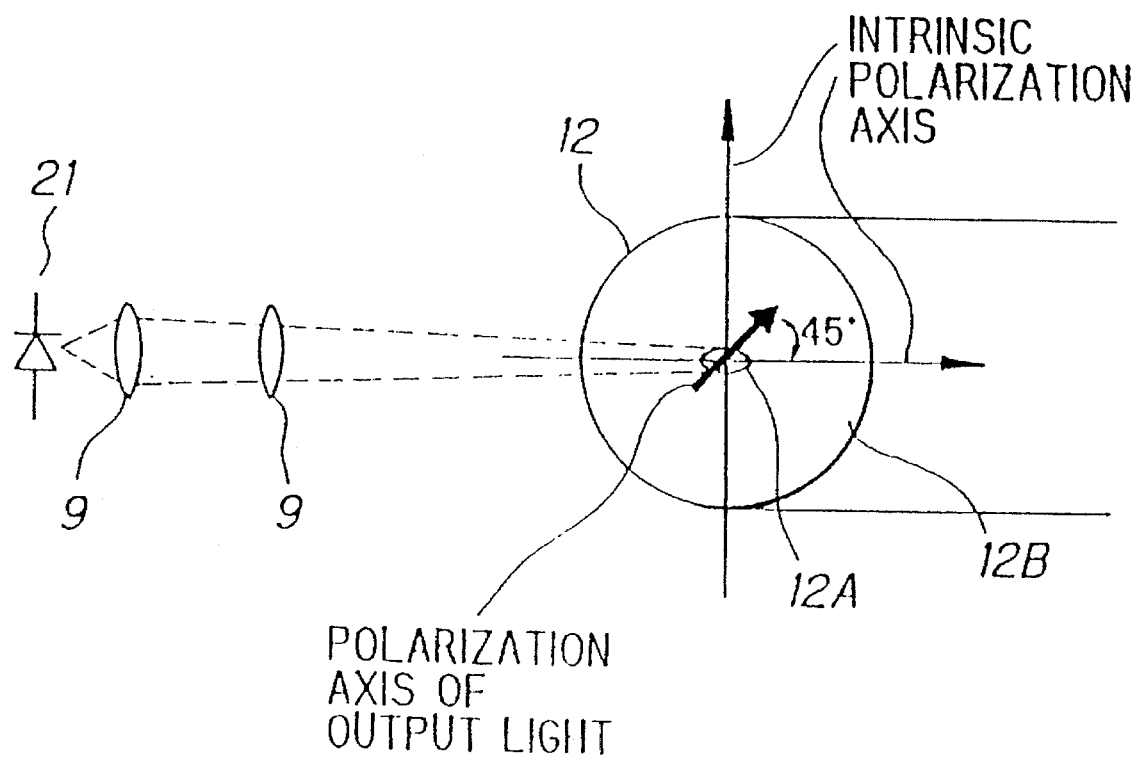
FIG. 7 is an explanatory diagram showing a coupling state between a laser diode and an optical fiber in the second preferred embodiment.

In the second preferred embodiment, it is not always required that the GaAlAs laser diode 21 has the aforementioned difference in attenuation or amplification factor between two lights of orthogonal polarizations, because the optical fiber 12 is set to be a predetermined length, but that a light signal emitted from the GaAlAs laser diode 21 is incident via the coupling lenses 9 to the end of the optical fiber 12 comprising an elliptical core 12A and a cladding layer 12B by 45° relative to intrinsic polarization axes thereof, as shown in FIG. 7.

In general, a light source used for an interference type optical fiber gyro is of a low coherence, and an output light of the light source is not a completely linearly polarized light. For this reason, a polarizer is used to provide a linearly polarized light, so that interference noise is removed by detecting the interference of only one polarized light.

In the second preferred embodiment, however, no polarizer is used, and a distance difference which is greater than an interference distance of "$\lambda^2/\Delta\lambda$" determined by a wavelength λ of the light source and a spectrum half width Δλ is assigned between two polarized lights to provide mutual incoherent relation therebetween, thereby removing the interference noise.

In the second preferred embodiment, the aforementioned predetermined length of the optical fiber 12 is calculated by the below equation, $$\lambda \cdot L/Lb > \lambda^2/\Delta\lambda$$

where "L" is the predetermined length of the optical fiber 12, "λ" is a wavelength of the light signal emitted from the GaAlAs laser diode 21, "Lb" is a coupling length of the optical fiber 12, and "Δλ" is the half width.

In the above equation, the left side "$\lambda \cdot L/Lb$" is a propagation distance difference between two lights of orthogonal polarizations propagating through the optical fiber 12 having the length L, and the right side "$\lambda^2/\Delta\lambda$" is the aforementioned interference distance.

In the first and second preferred embodiments, the optical fiber gyro is of an open loop type of the phase modulation method.

However, a closed type optical fiber gyro may be embodied. Further, a preamplifier which is normally used between the PIN photodiode 22 and the signal processing circuit 8 is not shown in the first and second preferred embodiment.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An optical fiber gyro, comprising:

a light source for emitting a light signal;

an optical coupler for receiving said light signal to be divided into first and second light signals, and receiving third and fourth light signals to be combined as a combined light signal;

an optical fiber sensing loop having first and second ends, said first and second light signals being optically coupled to said first and second ends of said optical fiber sensing loop to be propagated through said optical fiber sensing loop in clockwise and counter clockwise directions and to be supplied as said third and fourth light signals from said first and second ends;

a light receiver for receiving said combined light signal to be converted into an electric signal, said combined light signal being transmitted through said light source, and said light receiver being positioned behind said light source; and a signal processing circuit for processing said electric signal to provide a rotation angular velocity of a rotating member in accordance with a phase difference of said third and fourth light signals, said rotating member being loaded with said optical fiber sensing loop;

wherein said light source has a difference in attenuation or amplification factor between two light signals of orthogonal polarizations; and said optical fiber sensing loop is of a polarization plane maintaining optical fiber.

2. An optical fiber gyro, according to claim 1, wherein:

said light source has an extinction ratio ranging as follows:

$$-10dB \leqq \epsilon \leqq -2dB.$$

3. An optical fiber gyro, according to claim 1, wherein:

said light source has a polarization ratio p ranging as follows:

$$0.1 \leqq p \leqq 0.63.$$

4. An optical fiber gyro, comprising;

a light source for emitting a light signal;

an optical fiber for propagating said light signal to a predetermined position, said optical fiber having a predetermined length;

an optical coupler for receiving said light signal supplied from said optical fiber to be divided into first and second light signals, and receiving third and fourth light signals to be combined as a combined light signal;

an optical fiber sensing loop having first and second ends, said first and second light signals being optically coupled to said first and second ends of said optical fiber sensing loop to be propagated through said optical fiber sensing loop in clockwise and counter clockwise directions and to be supplied as said third and fourth light signals from said first and second ends;

a light receiver for receiving said combined light signal supplied from said optical fiber to be converted into an electric signal, said combined light signal being transmitted through said light source, and said light receiver being positioned behind said light source; and a signal processing circuit for processing said electric signal to provide a rotation angular velocity of a rotating member in accordance with a phase difference of said third and forth light signals, said rotating member being loaded with said optical fiber sensing loop;

wherein said predetermined length of said optical fiber is set to meet a relation in which a distance difference determined by said predetermined length and a phase difference of two orthogonally polarized lights propagated through said optical fiber is greater than an interference distance of said light source; and said optical fiber and said optical fiber sensing loop are of a polarization plane maintaining optical fiber.

5. An optical fiber gyro, according to claim 4, wherein:

said light source and said optical fiber are arranged such that said light signal is incident to said optical fiber in polarization plane by 45° relative to intrinsic axes of said optical fiber.

* * * * *